US012782297B2

(12) United States Patent
Hayashi et al.

(10) Patent No.: US 12,782,297 B2
(45) Date of Patent: Nov. 3, 2026

(54) RADIOGRAPHY APPARATUS

(71) Applicant: FUJIFILM Corporation, Tokyo (JP)

(72) Inventors: Tatsuhiko Hayashi, Tokyo (JP); Takafumi Ishitsu, Tokyo (JP); Taiga Goto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 80 days.

(21) Appl. No.: 19/090,357

(22) Filed: Mar. 25, 2025

(65) Prior Publication Data

US 2025/0305969 A1 Oct. 2, 2025

(30) Foreign Application Priority Data

Mar. 28, 2024 (JP) ................................ 2024-054844

(51) Int. Cl.
*G01N 23/046* (2018.01)

(52) U.S. Cl.
CPC ... *G01N 23/046* (2013.01); *G01N 2223/1016* (2013.01); *G01N 2223/3301* (2013.01); *G01N 2223/3303* (2013.01); *G01N 2223/401* (2013.01); *G01N 2223/419* (2013.01)

(58) Field of Classification Search
None
See application file for complete search history.

(56) References Cited

U.S. PATENT DOCUMENTS

2020/0323502 A1* 10/2020 Kojima .................. A61B 6/025
2023/0076183 A1* 3/2023 Onouchi .................. A61B 6/40
2024/0134071 A1* 4/2024 Ayukawa ................ G01T 1/244

FOREIGN PATENT DOCUMENTS

JP 2023-039071 A 3/2023

* cited by examiner

*Primary Examiner* — Hoon K Song
(74) *Attorney, Agent, or Firm* — Studebaker Brackett PLLC

(57) ABSTRACT

The radiography apparatus performs imaging in a plurality of imaging modes having different set beam widths in a rotation axis direction. A radiation detector has a plurality of sub-pixels arranged in a first direction parallel to the rotation axis and a second direction orthogonal to the rotation axis, a plurality of first macro-pixels, each of which is obtained by grouping a first number of sub-pixels arranged in the first direction, and a plurality of second macro-pixels, each of which is obtained by grouping a second number of sub-pixels arranged in the first direction are provided and the second macro-pixels are arranged such that the effective beam width decided by the numbers of the first macro-pixels and the second macro-pixels configuring slices in a number corresponding to the set beam width is in a predetermined range in which the effective beam width does not fall below each set beam width.

7 Claims, 12 Drawing Sheets

FIG. 6
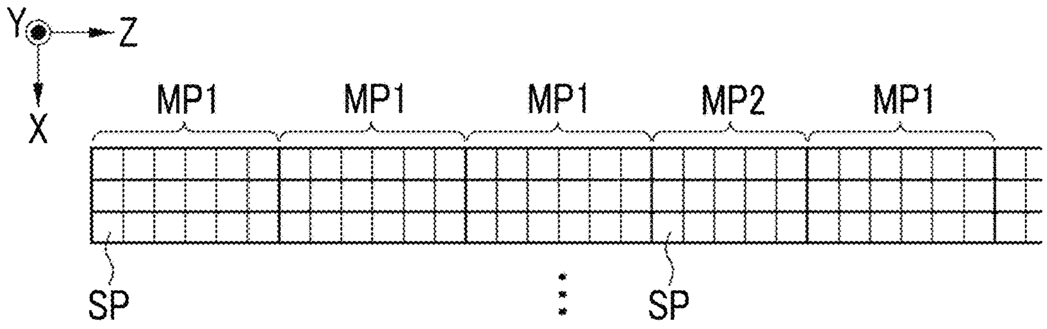
FIG. 7
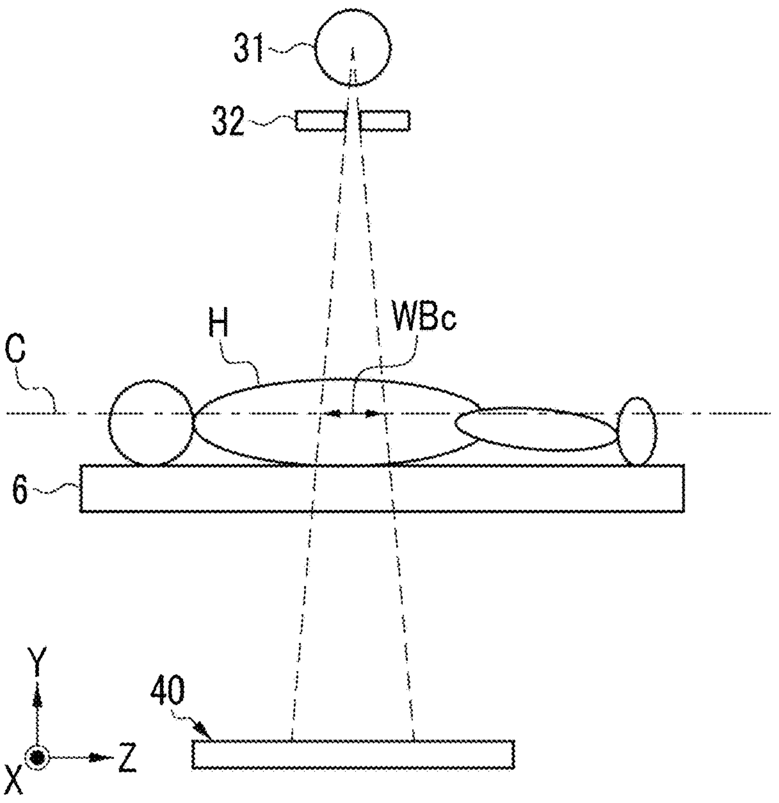
FIG. 8
| | IMAGING MODE | | | |
|---|---|---|---|---|
| WBc (mm) | 40 | 20 | 10 | 5 |
| $P_{SL}$ (mm) | 0.5 | 0.5 | 0.5 | 0.5 |
| $N_{SL}$ | 80 | 40 | 20 | 10 |

| | IMAGING MODE | | | |
|---|---|---|---|---|
| WBc (mm) | 40 | 20 | 10 | 5 |
| $N_{MP1}$ | 68 | 34 | 18 | 8 |
| $N_{MP2}$ | 12 | 6 | 2 | 2 |
| $N_G$ | 3 | 1 | 1 | 1 |
| L (mm) | 70.65 | 35.25 | 17.85 | 8.85 |
| WBe (mm) | 40.08 | 20.00 | 10.13 | 5.02 |
| $P_{SLe}$ (mm) | 0.501 | 0.500 | 0.506 | 0.502 |
| SID = 1079.2, SOD = 612.3<br>s = 0.15, g = 0.15 (UNIT: mm) | | | | |

FIG. 13

| | IMAGING MODE | | | |
|---|---|---|---|---|
| WBc (mm) | 40 | 20 | 10 | 5 |
| $N_{MP1}$ | 68 | 34 | 14 | 4 |
| $N_{MP2}$ | 12 | 6 | 6 | 6 |
| $N_G$ | 3 | 1 | 1 | 1 |
| L (mm) | 70.65 | 35.25 | 17.25 | 8.25 |
| WBe (mm) | 40.00 | * 19.96 | * 9.77 | * 4.67 |
| $P_{SLe}$ (mm) | 0.500 | * 0.499 | * 0.488 | * 0.467 |
| SID = 1081.5, SOD = 612.3<br>s = 0.15, g = 0.15 (UNIT: mm) | | | | |

| | IMAGING MODE | | | |
|---|---|---|---|---|
| WBc (mm) | 40 | 20 | 10 | 5 |
| $N_{MP1}$ | 68 | 34 | 16 | 8 |
| $N_{MP2}$ | 12 | 6 | 4 | 2 |
| $N_G$ | 3 | 1 | 1 | 1 |
| L (mm) | 70.65 | 35.25 | 17.55 | 8.85 |
| WBe (mm) | 40.00 | * 19.96 | * 9.94 | 5.01 |
| $P_{SLe}$ (mm) | 0.500 | * 0.499 | * 0.497 | 0.501 |
| SID = 1081.5, SOD = 612.3<br>s = 0.15, g = 0.15 (UNIT: mm) | | | | |

RADIOGRAPHY APPARATUS

CROSS-REFERENCE TO RELATED APPLICATIONS

The present application claims priority under 35 U.S.C. § 119 to Japanese Patent Application No. 2024-054844, filed on Mar. 28, 2024. The above application is hereby expressly incorporated by reference, in its entirety, into the present application.

BACKGROUND

1. Technical Field

The technology of the present disclosure relates to a radiography apparatus.

2. Description of the Related Art

In recent years, a photon counting computed tomography (PCCT) apparatus that is a radiography apparatus equipped with a photon counting detector has been known. Unlike a charge integration detector employed in a computed tomography (CT) apparatus in the related art, the photon counting detector can count photons of incident radiation. Since the PCCT apparatus can measure energy for each photon, more information can be obtained compared to the CT apparatus in the related art.

In the PCCT apparatus, incident photons are converted into charges in a semiconductor layer, and the photon counting is performed by a photon counting circuit counting the converted charges. Electrodes for applying a high voltage to the semiconductor layer are formed on an upper surface and a lower surface of the semiconductor layer, and a plurality of sub-pixels are configured by patterning the electrodes on the lower surface side. In addition, it is known that a plurality of macro-pixels are configured by grouping a plurality of sub-pixels into a plurality of groups (for example, refer to JP2023-039071A). As a result, photons can be counted in units of the sub-pixels or the macro-pixels.

In addition, as the CT apparatus, a multi-slice CT apparatus having a plurality of imaging modes with different slice thicknesses such as 40 mm, 20 mm, 10 mm, and 5 mm is known. The slice thickness corresponds to a beam width in a rotation axis direction (that is, a slice direction) of the radiation at a rotation axis of the CT apparatus. Each slice thickness is composed of a plurality of slices (so-called multi-slices). Hereinafter, the beam width set for each imaging mode is referred to as a "set beam width".

SUMMARY

In the PCCT apparatus, it is conceivable to execute a plurality of imaging modes having different slice thicknesses. In a case where photons are counted in units of the macro-pixels, one slice corresponds to a plurality of macro-pixels arranged in a channel direction orthogonal to the slice direction. In addition, the number of slices corresponding to the set beam width is composed of a plurality of macro-pixels in the slice direction in a region irradiated with the radiation. Therefore, an effective beam width on the rotation axis (hereinafter, referred to as an effective beam width) is decided by the number of macro-pixels for configuring the slices in a number corresponding to the set beam width.

The total number of sub-pixels in the slice direction may not be divisible by the number of groups of macro-pixels.

Therefore, it is considered to configure a plurality of first macro-pixels, each of which is obtained by grouping a first number of sub-pixels arranged in the slice direction, and a plurality of second macro-pixels, each of which is obtained by grouping a second number of sub-pixels arranged in the slice direction. For example, the first number is six, and the second number is five. In this case, the effective beam width is decided by the number of first macro-pixels and second macro-pixels for configuring the slices in a number corresponding to the set beam width. Since the number of sub-pixels included in the first macro-pixel is different from the number of sub-pixels included in the second macro-pixel, the effective beam width varies depending on the number of first macro-pixels and the arrangement of the second macro-pixels.

For example, in a case where the first macro-pixels are arranged at equal pitches and the second macro-pixels are arranged at unequal pitches, the effective beam width in each imaging mode varies depending on the arrangement of the second macro-pixels. That is, in any imaging mode, the effective beam width may fall below the set beam width. In a case where the effective beam width falls below the set beam width, the image quality of a tomographic image is degraded.

Therefore, the technology according to the present disclosure provides a radiography apparatus that allows an effective beam width to be within a predetermined range that does not fall below each of set beam widths to be set in a plurality of imaging modes.

A radiography apparatus according to an aspect of the technology of the present disclosure is a radiography apparatus which includes a radiation source that is rotated around a rotation axis and emits radiation, and a radiation detector that is rotated around the rotation axis in a state of facing the radiation source and detects the radiation, and which is capable of performing imaging in a plurality of imaging modes having different set beam widths in a rotation axis direction of the radiation at the rotation axis, in which the radiation detector has a plurality of sub-pixels arranged in a first direction parallel to the rotation axis and a second direction orthogonal to the rotation axis, a plurality of first macro-pixels, each of which is obtained by grouping a first number of sub-pixels arranged in the first direction, and a plurality of second macro-pixels, each of which is obtained by grouping a second number of sub-pixels arranged in the first direction are provided, the second number being different from the first number, and the second macro-pixels are arranged such that an effective beam width decided by the numbers of the first macro-pixels and the second macro-pixels configuring slices in a number corresponding to the set beam width is in a predetermined range in which the effective beam width does not fall below each set beam width.

It is preferable that the first number is larger than the second number.

It is preferable that the first number is six, and the second number is five.

It is preferable that the radiography apparatus further includes a photon counting circuit that counts photons for each of the first macro-pixels and each of the second macro-pixels; and an image processing unit that generates a radiation image on the basis of a count value obtained by the photon counting circuit.

It is preferable that the image processing unit corrects an artifact having a frequency caused by the arrangement of the second macro-pixels.

It is preferable that the image processing unit corrects the count value of the photons counted for each of the first macro-pixels and each of the second macro-pixels on the basis of the first number and the second number.

It is preferable that, in a case where the first number is larger than the second number, the image processing unit distributes a part of the count value of the photons for the first macro-pixel to the count value of the photons for an adjacent second macro-pixel.

According to the technology of the present disclosure, it is possible to provide a radiography apparatus that makes it possible to set an effective beam width in a predetermined range in which the effective beam width does not fall below each of set beam widths set in a plurality of imaging modes.

BRIEF DESCRIPTION OF THE DRAWINGS

Exemplary embodiments according to the technique of the present disclosure will be described in detail based on the following figures, wherein:

FIG. 6 is a diagram schematically illustrating an arrangement of first macro-pixels and second macro-pixels, FIG. 7 is a diagram illustrating a set beam width to be set for each imaging mode, FIG. 8 is a diagram illustrating a plurality of imaging modes, FIG. 13 is a diagram illustrating calculated values of an effective beam width in a case of arranging the second macro-pixels as illustrated in FIG. 12.

DETAILED DESCRIPTION

Hereinafter, embodiments according to the technology of the present disclosure will be described with reference to the drawings. The radiography apparatus of the present disclosure is applied to a PCCT apparatus including a radiation source that is rotated around a rotation axis and emits radiation, and a radiation detector that is rotated around the rotation axis in a state of facing the radiation source and detects the radiation. In the present embodiment, a case where the radiation is X-rays will be described as an example.

Embodiment

Figure 1:
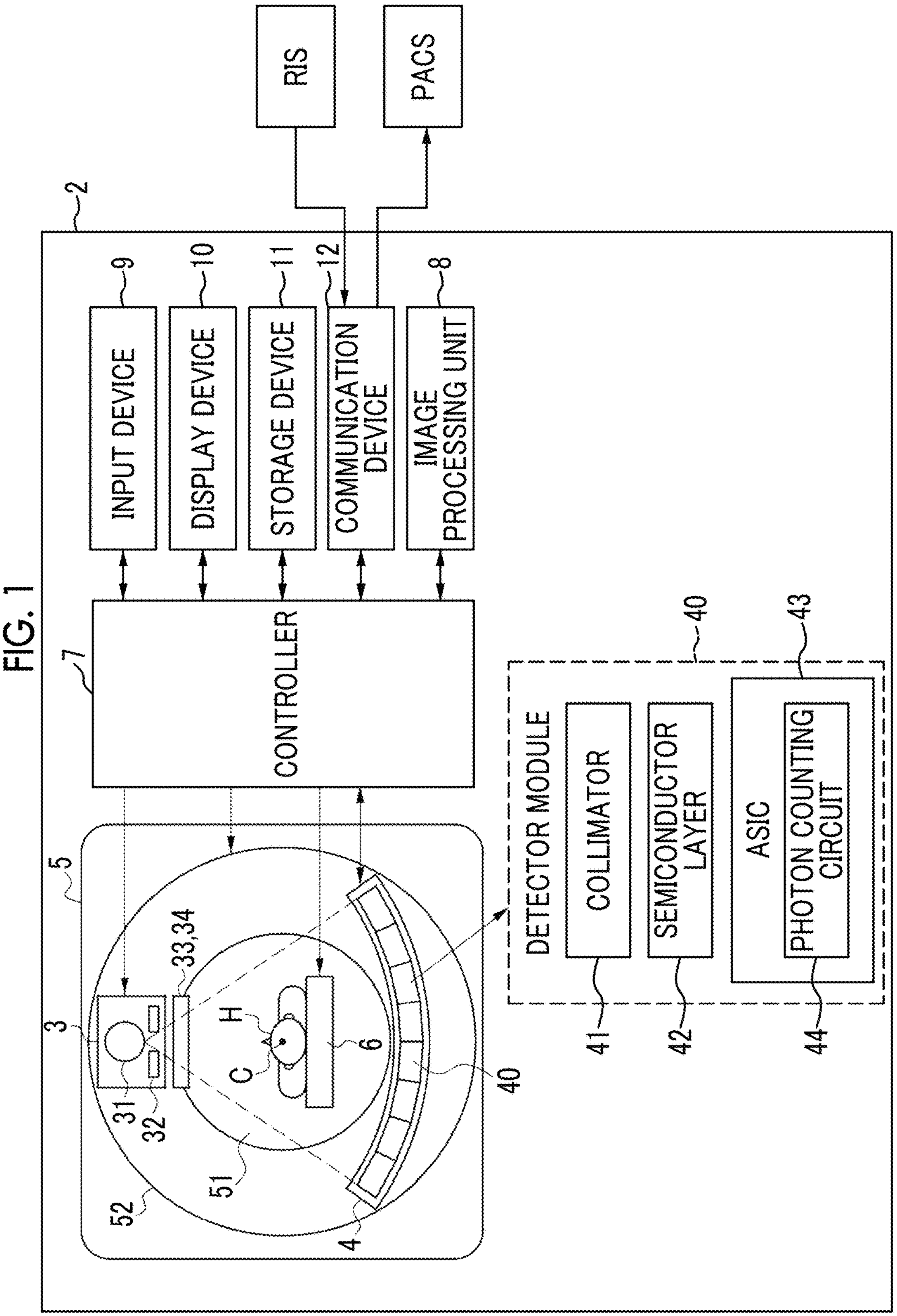
FIG. 1 is a diagram schematically illustrating a configuration of a radiography apparatus according to an embodiment.

FIG. 1 schematically illustrates a configuration of a radiography apparatus 2 according to an embodiment. The radiography apparatus 2 includes an X-ray source 3, an X-ray detector 4, a gantry 5, an examination table 6, a controller 7, and an image processing unit 8. A circular opening portion 51 for disposing the examination table 6 on which a subject H is placed is provided at the center of the gantry 5. In addition, the gantry 5 is provided with a rotation plate 52 in which the X-ray source 3 and the X-ray detector 4 are fixed at positions to face each other, and a drive mechanism (not illustrated) for rotating the rotation plate 52 around a rotation axis C.

Hereinafter, in the present disclosure, a circumferential direction of the opening portion 51 is referred to as an X direction, a radial direction is referred to as a Y direction, and a central axis direction is referred to as a Z direction (refer to FIG. 2). The Z direction is orthogonal to the X direction and the Y direction, and is generally a body axis direction of the subject H. The rotation axis C is parallel to the Z direction. The subject H is disposed such that the body axis substantially coincides with the rotation axis C.

In addition, the Z direction is a slice direction, and the X direction is a channel direction. The Z direction corresponds to a "first direction" according to the technology of the present disclosure. The X direction corresponds to a "second direction" according to the technology of the present disclosure.

The X-ray source 3 includes an X-ray tube 31, an aperture 32, an X-ray filter 33, and a bowtie filter 34. The X-ray tube 31 generates X-rays, and irradiates the subject H with the generated X-rays. The aperture 32 shapes the X-rays emitted from the X-ray tube 31 into a cone beam having a predetermined fan angle and a predetermined cone angle. The X-ray filter 33 adjusts the dose of the X-rays. The bowtie filter 34 optimizes an exposure dose by increasing the dose near the center and reducing the dose around the periphery in order to minimize the exposure dose in a peripheral portion.

Figure 2:
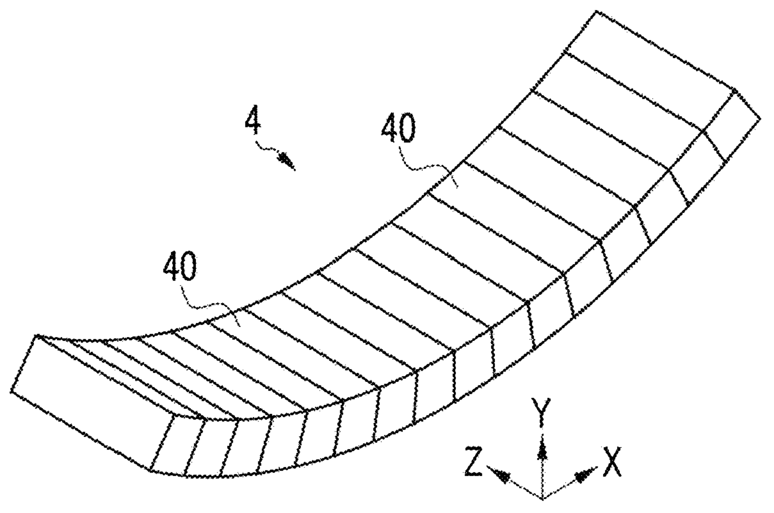
FIG. 2 is a perspective view schematically illustrating a configuration of an X-ray detector.

As illustrated in FIG. 2, the X-ray detector 4 is configured by arranging a plurality of detector modules 40 in an arc shape in the X direction. Each of the detector modules 40 includes a collimator 41, a semiconductor layer 42, and an application specific integrated circuit (ASIC) 43.

The collimator 41 is disposed on an X-ray incident side of the semiconductor layer 42, and removes scattered rays by restricting an incident direction of the X-rays onto the semiconductor layer 42. The semiconductor layer 42 is formed of cadmium zinc telluride (CZT), cadmium telluride (CdTe), or the like, and converts the X-rays that have passed through the subject H and are incident on the semiconductor layer 42, into charges corresponding to photons and outputs the charges.

The ASIC 43 is disposed on a side of the semiconductor layer 42 opposite to the collimator 41. The ASIC 43 is a circuit element having a plurality of photon counting circuits 44. The photon counting circuit 44 counts the charges output from the semiconductor layer 42 as the number of photons, and outputs a counting signal. As will be described in detail later, the semiconductor layer 42 is composed of a plurality of sub-pixels and a plurality of macro-pixels. The photon counting circuit 44 counts photons for each sub-pixel or macro-pixel, and outputs the counting signal.

The controller 7 is composed of a processor such as a central processing unit (CPU). The controller 7 controls the operations of the X-ray source 3, the X-ray detector 4, the gantry 5, and the examination table 6. Specifically, the controller 7 controls the irradiation of the X-rays from the X-ray tube 31 of the X-ray source 3, the change of the fan angle and the cone angle by the aperture 32, the detection of the X-rays by the X-ray detector 4, the rotation of the rotation plate 52 of the gantry 5, and the movement of the examination table 6. The X-ray source 3 and the X-ray detector 4 are rotated around the rotation axis C in a state of facing each other.

The controller 7 is configured to be able to execute a plurality of imaging modes having different slice thicknesses. The slice thickness corresponds to the beam width in the rotation axis direction (that is, the Z direction) of the X-rays at the rotation axis C. The controller 7 changes the beam width in the rotation axis direction by controlling the aperture 32 to change the cone angle for each imaging mode. That is, the radiography apparatus 2 is a multi-slice CT apparatus capable of performing imaging in a plurality of imaging modes having different beam widths in the rotation axis direction, and can acquire a plurality of tomographic images by one rotation.

In addition, the controller 7 acquires the counting signals output from the photon counting circuit 44 of the ASIC 43 for a plurality of views. The image processing unit 8 is an image processing processor that generates a tomographic image by performing reconstruction processing on the basis of a plurality of pieces of projection data represented by the counting signals acquired from each ASIC 43 by the controller 7 for a plurality of views. The image processing unit 8 may be configured as a part of the controller 7. The tomographic image is an example of a “radiation image” according to the technology of the present disclosure.

In addition, an input device 9, a display device 10, a storage device 11, and a communication device 12 are connected to the controller 7. The input device 9 is a device for an operator to input an operation instruction, and is composed of a keyboard, a mouse, and the like. The display device 10 is a display such as a liquid crystal display, and displays an operation screen, a tomographic image, and the like. The storage device 11 is a memory, a storage device, or the like, and stores a tomographic image, a program, various kinds of information, and the like.

The operator can select any of the plurality of imaging modes by operating the input device 9.

The communication device 12 is a communication interface for communication with a radiology information system (RIS), picture archiving and communication systems (PACS), and the like. The communication device 12 performs transmission control in accordance with a communication protocol defined by various wired or wireless communication standards.

Figure 3:
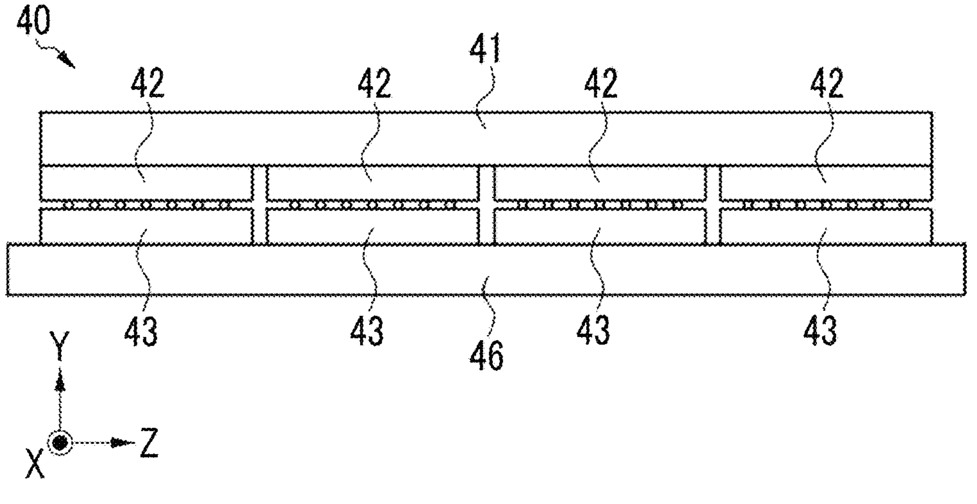
FIG. 3 is a diagram schematically illustrating a configuration example of a detector module.

FIG. 3 schematically illustrates a configuration example of the detector module 40. For example, the detector module 40 is a module in which four ASICs 43 are mounted on a holding substrate 46. The four ASICs 43 are arranged in the Z direction. The semiconductor layer 42 is connected to each ASIC 43. The collimator 41 is disposed on the four semiconductor layers 42. Note that the number of the semiconductor layers 42 and the number of the ASICs 43 included in the detector module 40 are not limited to four and may be an appropriate number.

Figure 4:
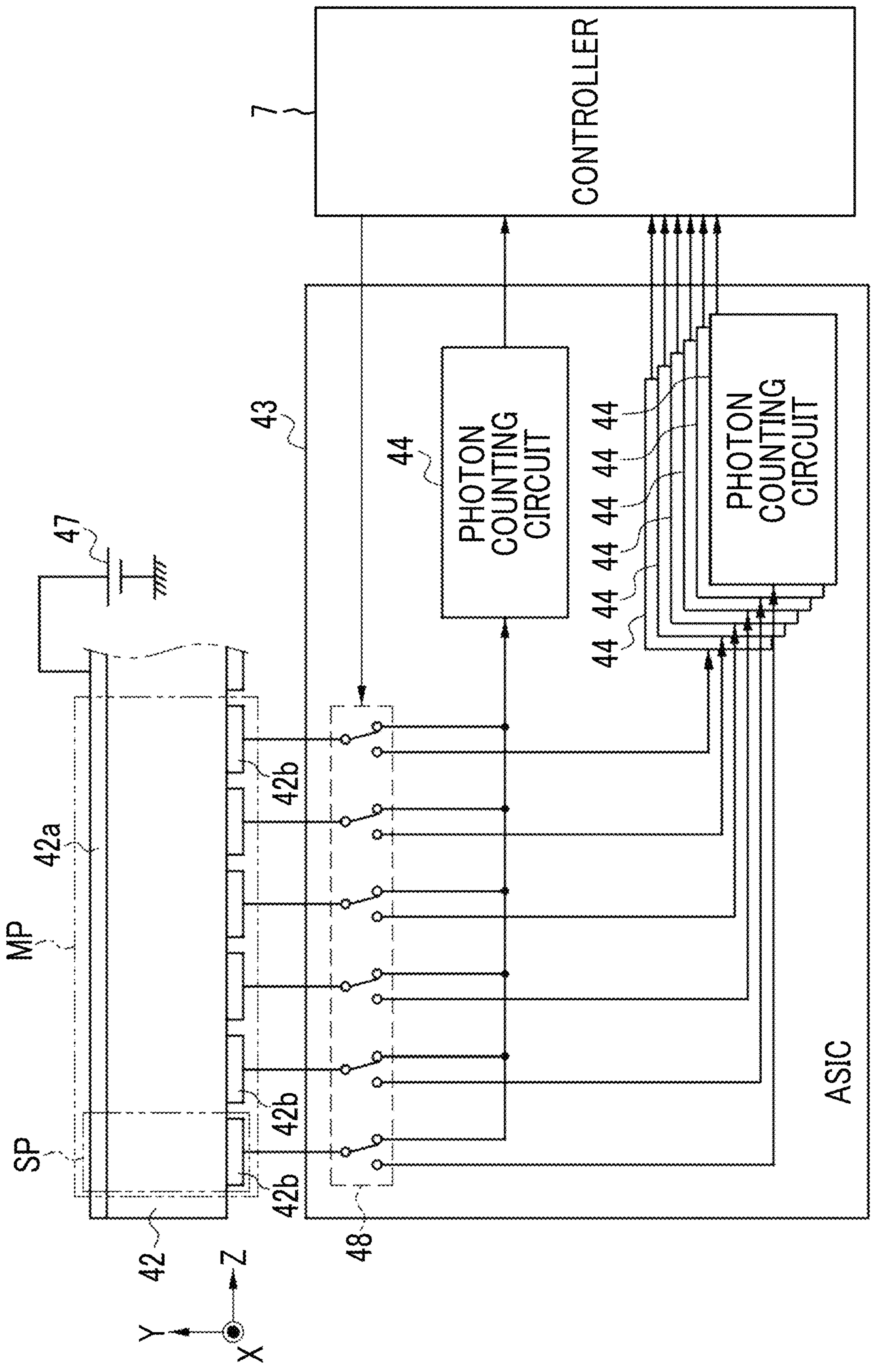
FIG. 4 is a diagram schematically illustrating a configuration of a semiconductor layer and an ASIC.

FIG. 4 schematically illustrates a configuration of the semiconductor layer 42 and the ASIC 43. A common electrode **42*a* is formed on an upper surface of the semiconductor layer 42, and a plurality of individual electrodes 42*b* are formed on a lower surface of the semiconductor layer 42. The individual electrodes 42*b* are two-dimensionally arranged in the X direction and the Z direction. One individual electrode 42*b* constitutes a sub-pixel SP. The common electrode 42*a* is an electrode common to the respective sub-pixels SP, and a bias voltage is applied from a power supply 47**.

In a case where the photons of X-rays are incident on the semiconductor layer 42, electron-hole pairs with a charge amount corresponding to the energy of the photons are generated, the generated electrons are moved to the common electrode **42*a*, and the generated holes are moved to the individual electrodes 42*b*. In a case where one photon is incident, the individual electrode 42*b*** generates a pulse signal with a voltage value proportional to the energy of the photon.

In addition, a macro-pixel MP is configured by grouping a plurality of sub-pixels SP arranged in the Z direction. In the present embodiment, a plurality of first macro-pixels MP1, each of which is obtained by grouping a first number of sub-pixels SP arranged in the Z direction, and a plurality of second macro-pixels MP2, each of which is obtained by grouping a second number of sub-pixels SP arranged in the Z direction are configured (refer to FIG. 6). Hereinafter, in a case where the first macro-pixel MP1 and the second macro-pixel MP2 are not distinguished from each other, the first macro-pixel MP1 and the second macro-pixel MP2 are simply referred to as the macro-pixel MP.

The ASIC 43 includes a plurality of photon counting circuits 44 and a switching circuit 48. The switching circuit 48 is connected between the plurality of individual electrodes **42*b* included in the macro-pixel MP and the plurality of photon counting circuits 44. The switching circuit 48 can switch between a macro-pixel mode in which a plurality of individual electrodes 42*b* are commonly connected to one photon counting circuit 44 and a sub-pixel mode in which a plurality of individual electrodes 42*b* are respectively connected to different photon counting circuits 44**.

The controller 7 controls the switching circuit 48 to switch between the macro-pixel mode and the sub-pixel mode. The macro-pixel mode is a mode in which the photons are counted for each macro-pixel MP. The sub-pixel mode is a mode in which the photons are counted for each sub-pixel SP. In the present embodiment, the macro-pixel mode will be described. For example, the macro-pixel mode is used in a case where a material discrimination image that differentiate and visualize materials with different X-ray attenuation coefficients is acquired.

The photon counting circuit 44 is composed of a plurality of energy discriminators and a plurality of counters connected to the energy discriminators, and counts the photons for each energy band while discriminating the energy of the photons into a plurality of energy bands on the basis of the pulse signals generated by the individual electrode **42*b***.

Figure 5:
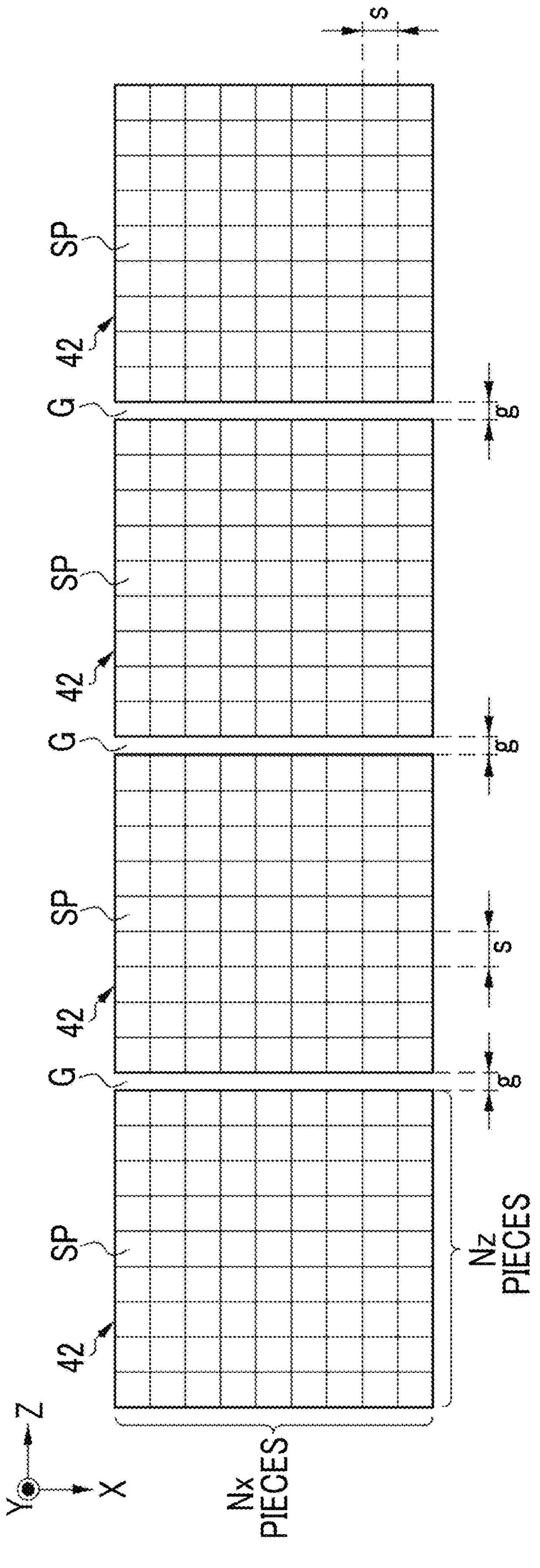
FIG. 5 is a diagram schematically illustrating an arrangement of sub-pixels configured in each of four semiconductor layers.

FIG. 5 schematically illustrates an arrangement of the sub-pixels SP configured in each of the four semiconductor layers 42. In one semiconductor layer 42, the sub-pixels SP are arranged at a constant arrangement pitch s in the X direction and the Y direction. In the present embodiment, the number Nx of the sub-pixels SP in the X direction and the number $N_Z$ of the sub-pixels SP in the Z direction, which are configured by one semiconductor layer 42, are equal to each other, and for example, $Nx=N_Z=128$.

The four semiconductor layers 42 are arranged in the Z direction, and a gap G is present between two semiconductor layers 42 adjacent to each other. A length g of the gap G in the Z direction (hereinafter, referred to as a gap length g) is an interval between two sub-pixels SP adjacent to each other between the two semiconductor layers 42. For example, the gap length g is equal to the arrangement pitch s of the sub-pixels SP.

FIG. 6 schematically illustrates an arrangement of the first macro-pixels MP1 and the second macro-pixels MP2. In the present embodiment, the first macro-pixel MP1 is composed of six sub-pixels SP, and the second macro-pixel MP2 is composed of five sub-pixels SP. That is, the first number is six, and the second number is five. In a case where $N_Z=128$, in one semiconductor layer 42, 18 first macro-pixels MP1 are present in the Z direction and four second macro-pixels MP2 are present in the Z direction. Hereinafter, the first number is denoted by $n_1$ and the second number is denoted by $n_2$.

In a case where $n_1=8$ and $n_2=8$, 128 can be divided by 8. Thus, it is not necessary to configure the first macro-pixels MP1 and the second macro-pixels MP2 having different numbers of sub-pixels SP. However, $n_1=6$ and $n_2=5$ are set in order to improve the resolution.

FIG. 7 illustrates a set beam width WBc set for each imaging mode. The set beam width WBc is a beam width in the rotation axis direction of the X-rays at the rotation axis C, and is set on the basis of the number of macro-pixels MP.

FIG. 8 illustrates a plurality of imaging modes. In the present embodiment, any one of four imaging modes of Wbc=40 mm, 20 mm, 10 mm, and 5 mm can be selected. Note that the number of slices corresponding to the set beam width is $N_{SL}$ and the slice pitch is $P_{SL}$. In a case where $P_{SL}=0.5$ mm is set in all the imaging modes, $N_{SL}=80$ in a case where WBc=40 mm, $N_{SL}=40$ in a case where WBc=20 mm, $N_{SL}=20$ in a case where WBc=10 mm, and $N_{SL}=10$ in a case where WBc=5 mm.

One slice corresponds to a plurality of macro-pixels MP arranged in the X direction (that is, the channel direction), and thus, the set beam width WBc corresponds to the macro-pixels MP in a number equal to the number $N_{SL}$ of slices.

Figure 9:
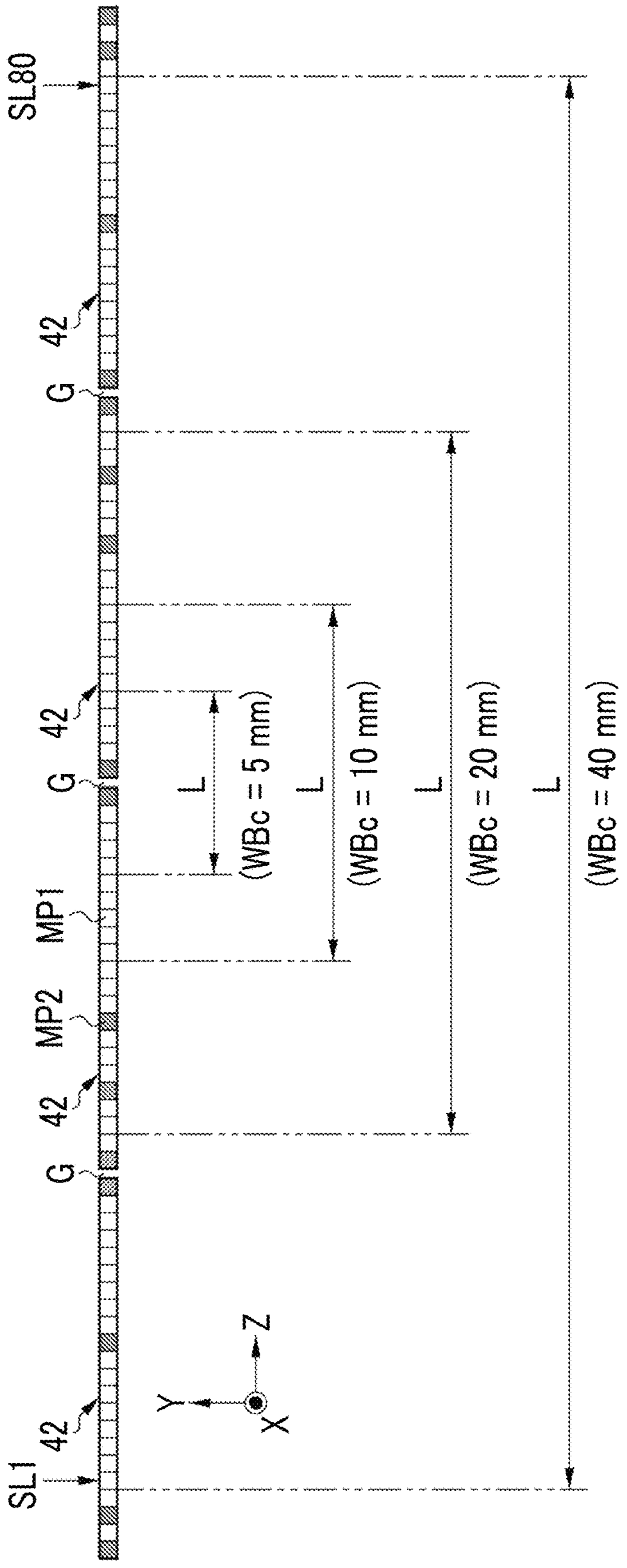
FIG. 9 is a diagram illustrating an arrangement example of second macro-pixels according to an embodiment.

FIG. 9 illustrates an arrangement example of the second macro-pixels MP2 according to the embodiment. In FIG. 9, a rectangular region that is not hatched represents the first macro-pixel MP1, and a rectangular region that is hatched represents the second macro-pixel MP2.

The first macro-pixels MP1 are arranged at equal pitches in the Z direction except for the locations where the second macro-pixels MP2 are present. The second macro-pixels MP2, which are smaller in number than the first macro-pixels MP1, are arranged at unequal pitches in the Z direction.

In addition, in FIG. 9, L represents a length (hereinafter, referred to as a configuration length) in the Z direction of a plurality of macro-pixels MP (including the first macro-pixels MP1 and the second macro-pixels MP2) for configuring $N_{SL}$ slices corresponding to the set beam width WBc. That is, the configuration length L corresponds to the slice thickness. The plurality of macro-pixels MP are irradiated with the X-rays.

In addition, in FIG. 9, SLI indicates a first slice position in a case where WBc=40 mm, and SL80 indicates an 80th slice position in a case where WBc=40 mm. The second macro-pixels MP2 are arranged at slice positions SL9, SL18, SL19, SL23, SL27, SL40, SL41, SL54, SL58, SL62, SL63, and SL72.

The configuration length L is expressed by the following Equation (1) in consideration of the presence of the gap G.

$$L = s \times (n_1 \times N_{MP1} + n_2 \times N_{MP2}) + g \times N_G \tag{1}$$

Here, $N_{MP1}$ is the number of first macro-pixels MP1, $N_{MP2}$ is the number of second macro-pixels MP2, and $N_G$ is the number of gaps G.

Since the relationship of $N_{SL}=N_{MP1}+N_{MP2}$ is satisfied, Equation (1) is modified to Equation (1a).

$$L = s \times \{n_1 \times N_{SL} + (n_2 - n_1) \times N_{MP2}\} + g \times N_G \tag{1a}$$

Figures 10, 11:
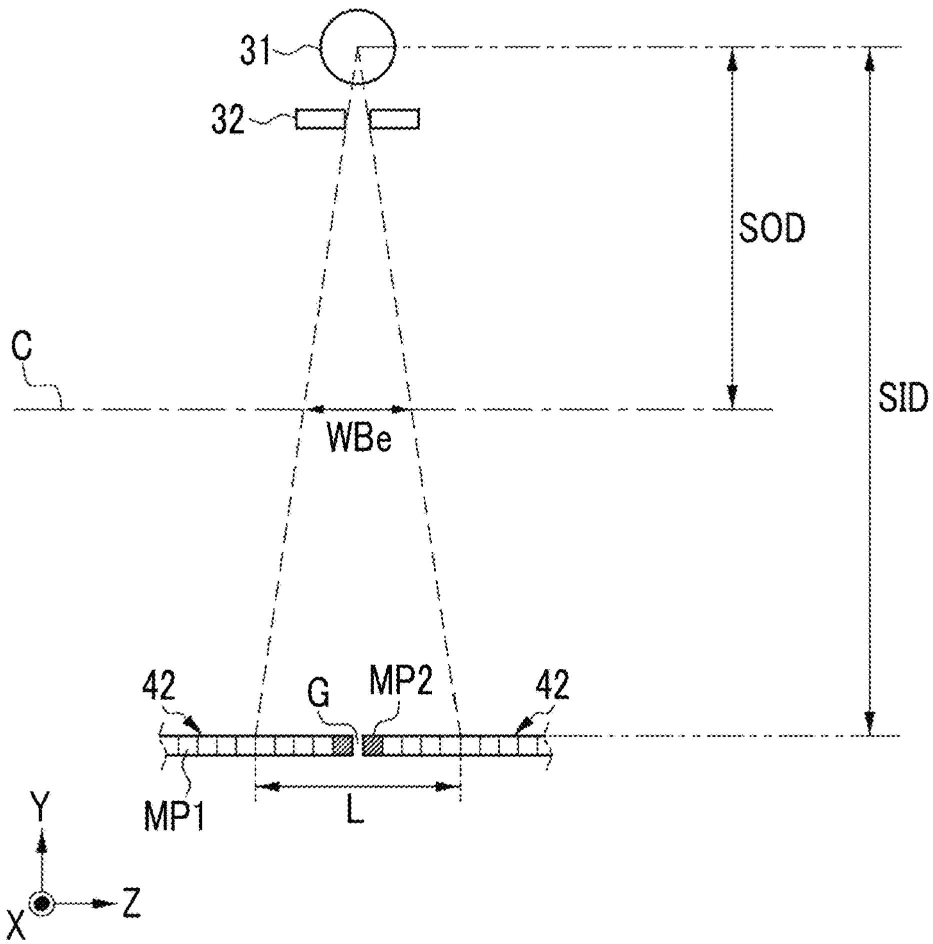
FIG. 10 is a diagram illustrating an effective beam width.
FIG. 11 is a diagram illustrating calculated values of an effective beam width in a case of arranging the second macro-pixels as illustrated in FIG. 9.

FIG. 10 illustrates an effective beam width. In FIG. 10, WBe represents an effective beam width decided on the basis of the number of the plurality of macro-pixels MP for configuring $N_{SL}$ slices corresponding to the set beam width WBc.

The effective beam width WBe is represented by Equation (2) by a geometrical relationship using the configuration length L.

$$WBe = L \times SOD/SID \tag{2}$$

Here, the SOD is a length in the Y direction from the X-ray tube 31 to the rotation axis C. The SID is a length in the Y direction from the X-ray tube 31 to the detector module 40 (specifically, the semiconductor layer 42).

As illustrated in Equation (1a), the configuration length L depends on the number $N_{MP2}$ of the second macro-pixels MP2. In the present embodiment, since $n_1>n_2$, the effective beam width WBe is smaller as the number $N_{MP2}$ of the second macro-pixels MP2 is larger, and there is a possibility that the effective beam width WBe falls below the set beam width WBc.

In a case where the effective beam width WBe falls below the set beam width WBc, the image quality of the tomographic image is degraded, and therefore, in the present embodiment, the arrangement of the second macro-pixels MP2 is decided so as to satisfy the following Equation (3).

$$WBc \leq WBe \leq WBc \times \alpha \tag{3}$$

Here, a is a coefficient for defining the upper limit of the effective beam width WBe, and, for example, α=1.02. The range defined by Equation (3) is an example of a "predetermined range" according to the technology of the present disclosure.

FIG. 11 illustrates calculated values of the effective beam width WBe in a case of arranging the second macro-pixels MP2 as illustrated in FIG. 9. Here, SID=1079.2 mm, SOD=612.3 mm, s=0.15 mm, and g=0.15 mm. In addition, FIG. 11 illustrates calculated values of an effective slice pitch $P_{SLe}$ represented by Equation (4).

$$P_{SLe} = WBe/N_{SL} \quad (4)$$

As illustrated in FIG. 11, according to the present embodiment, it can be seen that the effective beam width WBe is within the range defined by Equation (3) described above, where the effective beam width WBe does not fall below the set beam width WBc in any imaging mode. In addition, it can be seen that the effective slice pitch $P_{SLe}$ does not fall below the original slice pitch $P_{SL}$ in any imaging mode. Therefore, according to the present embodiment, it is possible to suppress the degradation of the image quality of the tomographic image.

Comparative Example

Hereinafter, a comparative example in which the arrangement of the second macro-pixels MP2 is different from that of the above-described embodiment will be described.

Figure 12:
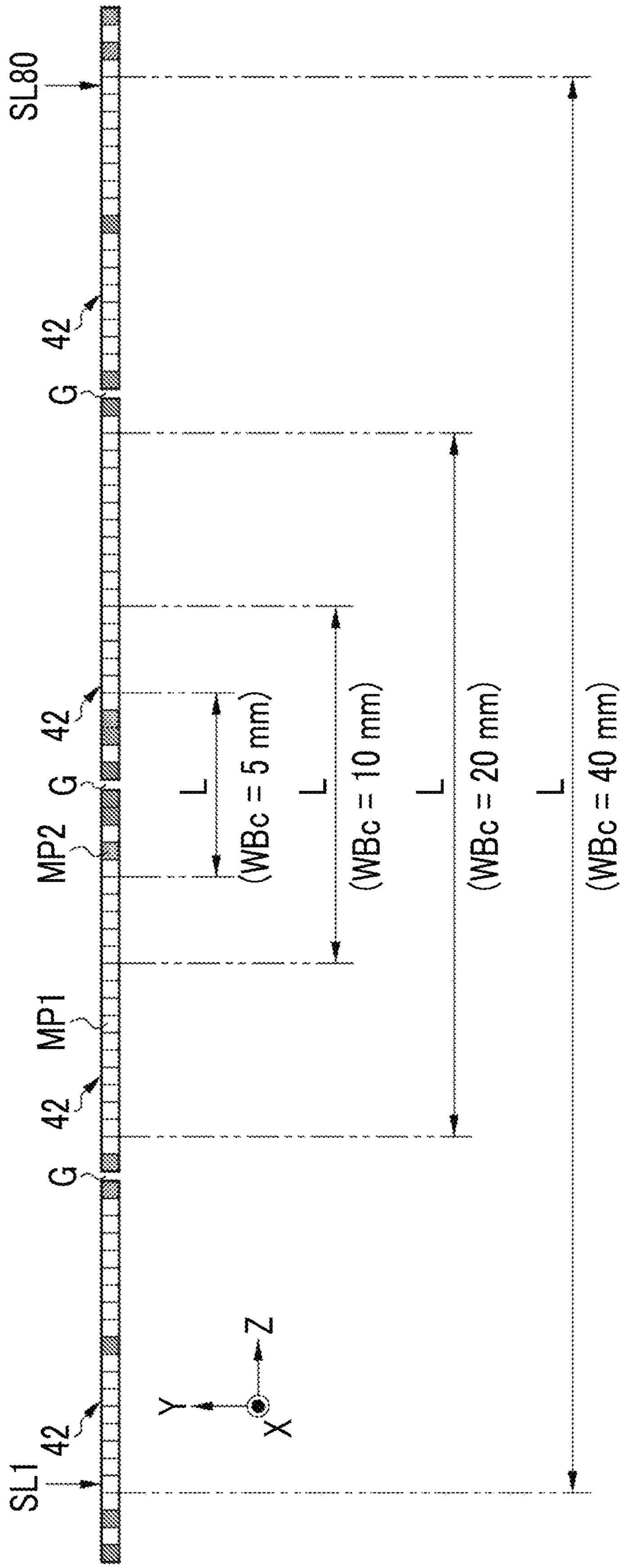
FIG. 12 is a diagram illustrating an arrangement example of second macro-pixels according to a first comparative example.

FIG. 12 illustrates an arrangement example of the second macro-pixel MP2 according to a first comparative example. The configuration of the radiography apparatus 2 according to the present comparative example is the same as that in the above-described embodiment except that the arrangement of the second macro-pixels MP2 is different. In the present comparative example, the second macro-pixels MP2 are arranged at slice positions SL9, SL18, SL19, SL37, SL39, SL40, SL41, SL43, SL44, SL62, SL63, and SL72.

In the present comparative example, SID=1081.5 mm, SOD=612.3 mm, s=0.15 mm, and g=0.15 mm.

FIG. 13 illustrates calculated values of the effective beam width WBe in a case of arranging the second macro-pixels MP2 as illustrated in FIG. 12. As illustrated in FIG. 13, in the first comparative example, it can be seen that the effective beam width WBe falls below the set beam width WBc in a case where WBc=20 mm, 10 mm, and 5 mm.

Figure 14:
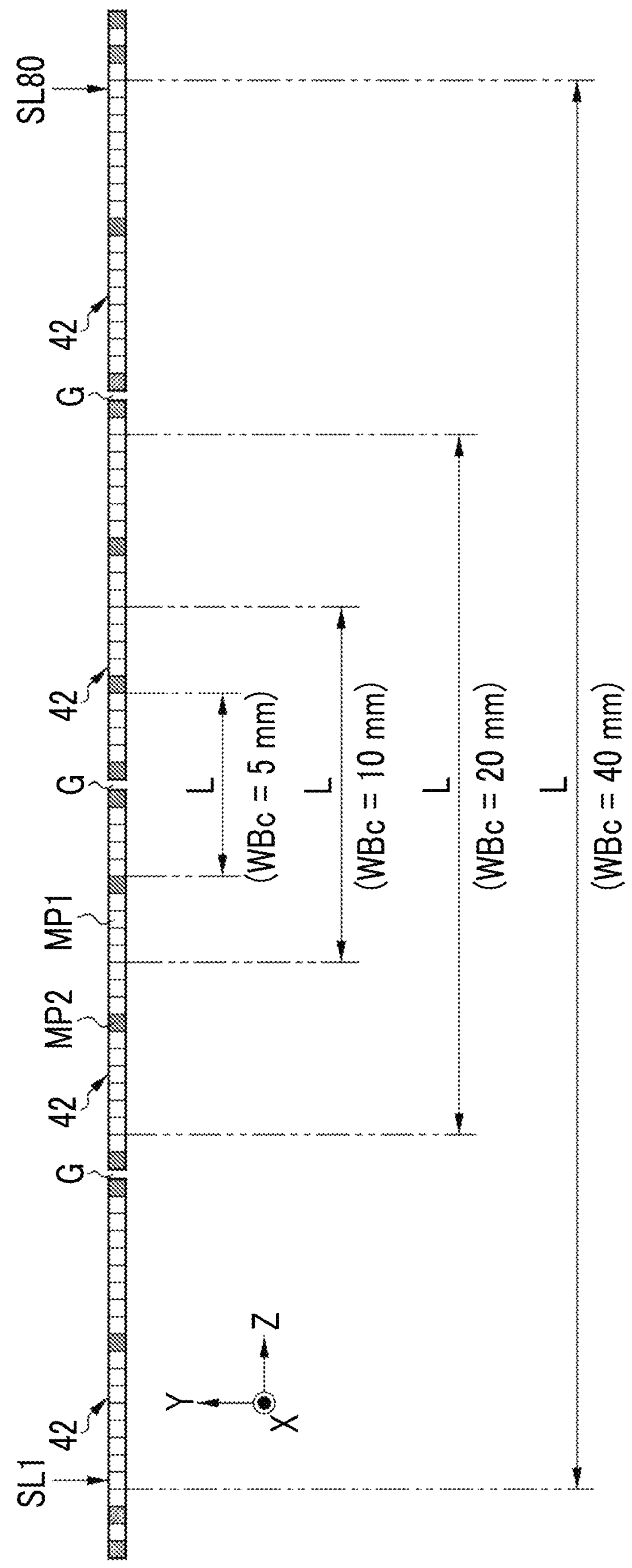
FIG. 14 is a diagram illustrating an arrangement example of second macro-pixels according to a second comparative example.

FIG. 14 illustrates an arrangement example of second macro-pixels MP2 according to a second comparative example. The configuration of the radiography apparatus 2 according to the present comparative example is the same as that in the above-described embodiment except that the arrangement of the second macro-pixels MP2 is different. In the present comparative example, the second macro-pixels MP2 are arranged at slice positions SL9, SL18, SL19, SL27, SL35, SL40, SL41, SL46, SL54, SL62, SL63, and SL72.

In the present comparative example, SID=1081.5 mm, SOD=612.3 mm, s=0.15 mm, and g=0.15 mm.

Figures 15, 16:
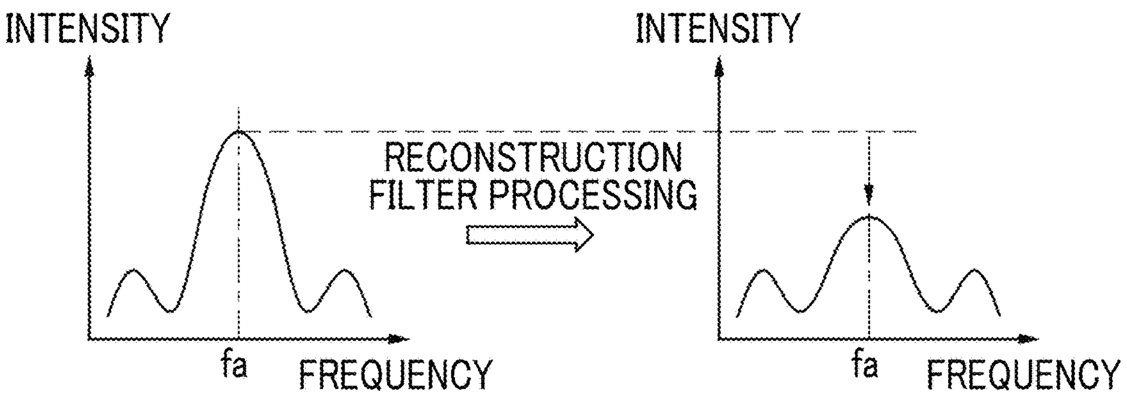
FIG. 15 is a diagram illustrating calculated values of an effective beam width in a case of arranging the second macro-pixels as illustrated in FIG. 14.
FIG. 16 is a diagram illustrating an example of processing of suppressing an artifact.

FIG. 15 illustrates calculated values of the effective beam width WBe in a case of arranging the second macro-pixels MP2 as illustrated in FIG. 14. As illustrated in FIG. 15, in the second comparative example, it can be seen that the effective beam width WBe falls below the set beam width WBc in a case where WBc=20 mm and 10 mm.

Image Processing

In the above-described embodiment, since the second macro-pixels MP2 are arranged at unequal pitches, an artifact having a frequency caused by the arrangement of the second macro-pixels MP2 may occur in the tomographic image reconstructed by the image processing unit 8. It is assumed that this artifact appears as a ring artifact having a ring shape, a resolution characteristic is deteriorated, and the like.

Therefore, it is preferable that the image processing unit 8 corrects the artifact having the frequency caused by the arrangement of the second macro-pixels MP2. For example, as illustrated in FIG. 16, in a case where the tomographic image has a frequency fa caused by the arrangement of the second macro-pixels MP2, the image processing unit 8 suppresses the artifact by performing correction corresponding to the frequency fa. A reconstruction filter such as a so-called ramp filter can be used for this correction.

Figure 17:
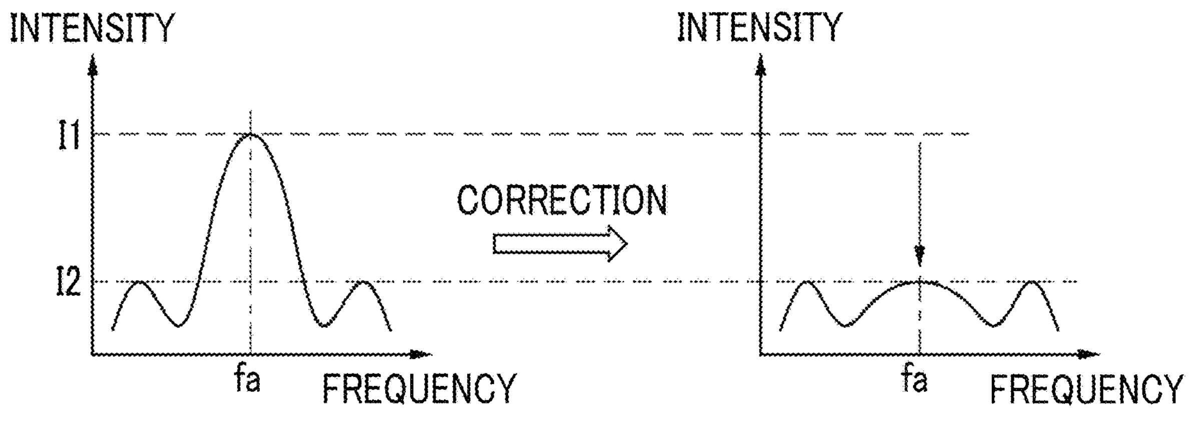
FIG. 17 is a diagram illustrating another example of processing of suppressing an artifact.

In addition, as illustrated in FIG. 17, the image processing unit 8 may correct the tomographic image such that intensity I1 of the frequency fa approaches intensity 12 of the surrounding frequency, on the basis of the information on the frequency components around the frequency fa of the artifact.

In addition, in the above-described embodiment, the plurality of slices having a constant slice pitch are generated by the plurality of macro-pixels MP including the second macro-pixel MP2 having unequal pitches. Therefore, the sampling positions of the slices in the above-described embodiment are different from the ideal sampling positions in a case where the macro-pixels MP are arranged at equal pitches. As a result, it is considered that the resolution may be lowered.

Therefore, it is preferable that the image processing unit 8 corrects the count value of the photons counted for each first macro-pixel MP1 and each second macro-pixel MP2 on the basis of the first number $n_1$ and the second number $n_2$. Specifically, it is preferable that the image processing unit 8 distributes a part of the count value of the photons for the first macro-pixel MP1 to the count value of the photons for the adjacent second macro-pixel MP2.

Figure 18:
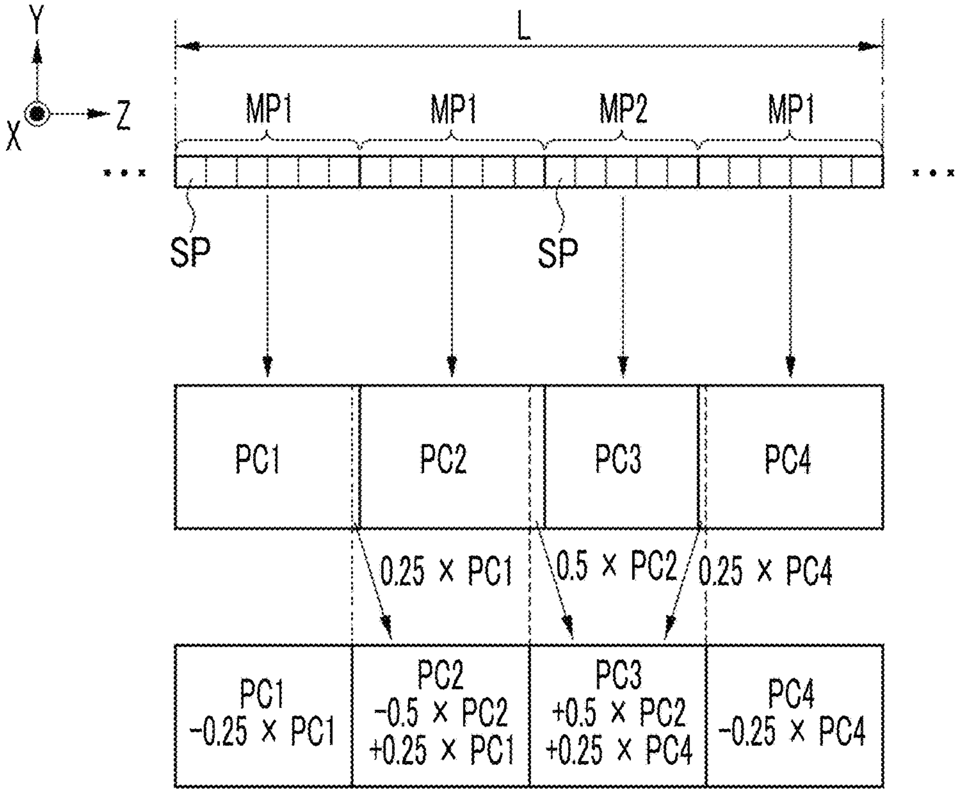
FIG. 18 is a diagram illustrating processing of distributing count values.

FIG. 18 illustrates a case where a plurality of slices are generated by three first macro-pixels MP1 and one second macro-pixel MP2 that are arranged in the Z direction, for simplicity. PC1 to PC4 illustrated in FIG. 18 represent the count values of photons. PC1 is a count value for the first macro-pixel MP1 at the left end. PC2 is a count value for the first macro-pixel MP1 that is second from the left end. PC3 is a count value for the second macro-pixel MP2 that is third from the left end. PC4 is a count value for the first macro-pixel MP1 that is fourth from the left end.

In this case, the image processing unit 8 distributes a part of the count value PC2 and a part of the count value PC4 to the count value PC3. Specifically, the image processing unit 8 adds "0.5×PC2" to PC3 and subtracts "0.5×PC2" from PC2. In addition, the image processing unit 8 adds "0.25×PC4" to PC3 and subtracts "0.25×PC4" from PC4.

In addition, the image processing unit 8 also distributes a part of the count value between the adjacent first macro-pixels MP1. Specifically, the image processing unit 8 adds "0.25×PC1" to PC2 and subtracts "0.25×PC1" from PC1.

The above-described 0.5 and 0.25 are the distribution coefficients decided on the basis of the configuration length L, the first number $n_1$, and the second number $n_2$.

Accordingly, counting data for the three first macro-pixels MP1 and one second macro-pixel MP2 arranged in the Z direction is the equidistant data, so that the resolution is improved.

In addition, in the above-described embodiment, the X-rays have been described as an example of the radiation, but γ-rays may be used as the radiation.

In addition, in the above-described embodiment, various processors described below can be used as the hardware structure of the controller 7. The various processors include, in addition to a CPU that is a general-purpose processor that executes software (program) to function as various processing units, a programmable logic device (PLD) of which a circuit configuration can be changed after manufacturing, such as a field-programmable gate array (FPGA), and a dedicated electric circuit that is a processor having a circuit configuration dedicatedly designed for executing specific processing, such as an ASIC.

Various types of processing described above may be executed by one of the various processors or may be executed by a combination of two or more processors (for example, a combination of a plurality of FPGAs or a CPU and an FPGA) of the same type or different types. In addition, a plurality of processing units may be configured by one processor. As an example where a plurality of processing units are composed of one processor, there is a form in which a processor that realizes all functions of a system including a plurality of processing units into one integrated circuit (IC) chip is used, such as a system on a chip (SOC).

It is possible to understand technologies described in the following supplementary notes from the above description.

Supplementary Note 1

A radiography apparatus comprising:

a radiation source that is rotated around a rotation axis and emits radiation; and a radiation detector that is rotated around the rotation axis in a state of facing the radiation source and detects the radiation, wherein the radiography apparatus is capable of performing imaging in a plurality of imaging modes having different set beam widths in a rotation axis direction of the radiation at the rotation axis, the radiation detector has a plurality of sub-pixels arranged in a first direction parallel to the rotation axis and a second direction orthogonal to the rotation axis, a plurality of first macro-pixels, each of which is obtained by grouping a first number of sub-pixels arranged in the first direction, and a plurality of second macro-pixels, each of which is obtained by grouping a second number of sub-pixels arranged in the first direction are provided, the second number being different from the first number, and the second macro-pixels are arranged such that an effective beam width decided by the numbers of the first macro-pixels and the second macro-pixels configuring slices in a number corresponding to the set beam width is in a predetermined range in which the effective beam width does not fall below each set beam width.

Supplementary Note 2

The radiography apparatus according to Supplementary Note 1, wherein the first number is larger than the second number.

Supplementary Note 3

The radiography apparatus according to Supplementary Note 2, wherein the first number is six, and the second number is five.

Supplementary Note 4

The radiography apparatus according to any one of Supplementary Notes 1 to 3, further comprising:

a photon counting circuit that counts photons for each of the first macro-pixels and each of the second macro-pixels; and an image processing unit that generates a radiation image on the basis of a count value obtained by the photon counting circuit.

Supplementary Note 5

The radiography apparatus according to Supplementary Note 4, wherein the image processing unit corrects an artifact having a frequency caused by the arrangement of the second macro-pixels.

Supplementary Note 6

The radiography apparatus according to Supplementary Note 4 or 5, wherein the image processing unit corrects the count value of the photons counted for each of the first macro-pixels and each of the second macro-pixels on the basis of the first number and the second number.

Supplementary Note 7

The radiography apparatus according to Supplementary Note 6, wherein in a case where the first number is larger than the second number, the image processing unit distributes a part of the count value of the photons for the first macro-pixel to the count value of the photons for an adjacent second macro-pixel.

What is claimed is:

1. A radiography apparatus comprising:

a radiation source that is rotated around a rotation axis and emits radiation; and a radiation detector that is rotated around the rotation axis in a state of facing the radiation source and detects the radiation, wherein the radiography apparatus is capable of performing imaging in a plurality of imaging modes having different set beam widths in a rotation axis direction of the radiation at the rotation axis, the radiation detector has a plurality of sub-pixels arranged in a first direction parallel to the rotation axis and a second direction orthogonal to the rotation axis, a plurality of first macro-pixels, each of which is obtained by grouping a first number of sub-pixels arranged in the first direction, and a plurality of second macro-pixels, each of which is obtained by grouping a second number of sub-pixels arranged in the first direction are provided, the second number being different from the first number, and the second macro-pixels are arranged such that an effective beam width decided by the numbers of the first macro-pixels and the second macro-pixels configuring slices in a number corresponding to the set beam width is in a predetermined range in which the effective beam width does not fall below each set beam width.

2. The radiography apparatus according to claim 1, wherein the first number is larger than the second number.

3. The radiography apparatus according to claim 2, wherein the first number is six, and the second number is five.

4. The radiography apparatus according to claim 1, further comprising:

a photon counting circuit that counts photons for each of the first macro-pixels and each of the second macro-pixels; and an image processor that generates a radiation image on the basis of a count value obtained by the photon counting circuit.

5. The radiography apparatus according to claim 4, wherein the image processor corrects an artifact having a frequency caused by the arrangement of the second macro-pixels.

6. The radiography apparatus according to claim 4, wherein the image processor corrects the count value of the photons counted for each of the first macro-pixels and each of the second macro-pixels on the basis of the first number and the second number.

7. The radiography apparatus according to claim 6, wherein in a case where the first number is larger than the second number, the image processor distributes a part of the count value of the photons for the first macro-pixel to the count value of the photons for an adjacent second macro-pixel.

* * * * *